US008854636B2

(12) United States Patent
Kang et al.

(10) Patent No.: US 8,854,636 B2
(45) Date of Patent: Oct. 7, 2014

(54) HOST DEVICE WITH UNIVERSAL IMAGE SCANNING DEVICE DRIVER AND DRIVER MANAGEMENT METHOD THEREOF

(75) Inventors: Kyung-hoon Kang, Suwon-si (KR); Hak-ju Lee, Suwon-si (KR); Jung-mo Hong, Suwon-si (KR); Hyun-jung Park, Seoul (KR); Dong-hoan Koo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 772 days.

(21) Appl. No.: 12/656,782

(22) Filed: Feb. 16, 2010

(65) Prior Publication Data
US 2011/0026061 A1 Feb. 3, 2011

(30) Foreign Application Priority Data
Jul. 31, 2009 (KR) ........................ 10-2009-0070735

(51) Int. Cl.
*G06F 3/12* (2006.01)
*H04N 1/00* (2006.01)
*G06F 9/44* (2006.01)

(52) U.S. Cl.
CPC ............... *H04N 1/00* (2013.01); *H04N 1/0097* (2013.01); *G06F 8/30* (2013.01); *G06F 9/4411* (2013.01)
USPC .......... 358/1.13; 715/762; 715/738; 717/174; 719/327

(58) Field of Classification Search
USPC ......... 358/1.13, 1.1, 1.15, 300, 474; 235/383; 345/501; 709/223, 224; 710/73, 8; 715/762, 738; 717/168, 174; 719/327
See application file for complete search history.

(56) References Cited

U.S. PATENT DOCUMENTS

| 5,835,721 | A | * | 11/1998 | Donahue et al. | ............... 709/224 |
| 6,122,684 | A | * | 9/2000 | Sakura | ............... 710/73 |
| 6,697,073 | B1 | * | 2/2004 | Kadota | ........................ 345/501 |
| 6,952,831 | B1 | * | 10/2005 | Moore | .......................... 719/327 |
| 7,895,609 | B2 | | 2/2011 | Inoue | |
| 2004/0215754 | A1 | * | 10/2004 | Orleth et al. | ................... 709/223 |
| 2006/0095924 | A1 | * | 5/2006 | Inoue | .............................. 719/327 |
| 2007/0097400 | A1 | | 5/2007 | Yasui et al. | |
| 2007/0211310 | A1 | * | 9/2007 | Kadota | .......................... 358/474 |

(Continued)

FOREIGN PATENT DOCUMENTS

EP 1653352 A1 5/2006
JP 2006-127218 5/2006

OTHER PUBLICATIONS

European Search Report dated Dec. 2, 2011 issued in corresponding European Patent Application No. 10157586.8.

(Continued)

*Primary Examiner* — David S Cammack
(74) *Attorney, Agent, or Firm* — Staas & Halsey LLP

(57) ABSTRACT

A host device and a driver management method of the host device are provided. The driver management method of the host device includes searching for at least one image scanning device connected to the host device, displaying a list of the at least one image scanning device found as a result of searching, selecting one of the at least one image scanning device from the displayed list, generating a user-specified driver for the selected image scanning device, and adding the generated user-specified driver. Therefore, it is possible to simplify the use of a universal image scanning device driver.

20 Claims, 6 Drawing Sheets

(56) References Cited

U.S. PATENT DOCUMENTS

2007/0284440 A1* 12/2007 Birmingham et al. ........ 235/383
2007/0300216 A1* 12/2007 Miyagi ......................... 717/168
2008/0180712 A1* 7/2008 Selvaraj ....................... 358/1.13
2008/0246986 A1* 10/2008 Scrafford et al. ............ 358/1.15
2009/0094539 A1 4/2009 Wang et al.

OTHER PUBLICATIONS

Korean Office Action issued May 20, 2014 in corresponding Korean Application No. 10-2009-0070735.

* cited by examiner

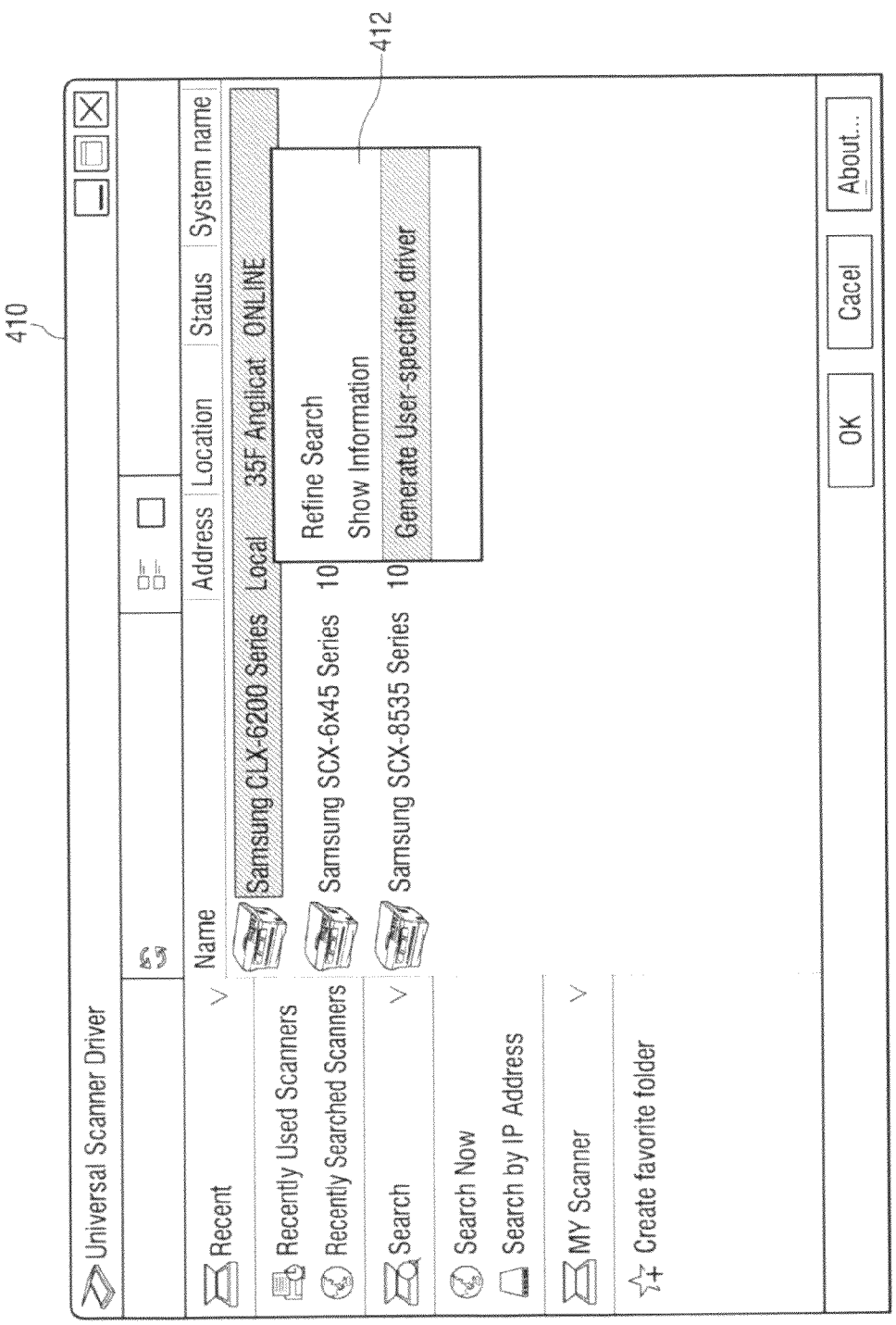

FIG. 3B

| Universal Scanner Driver | | |
|---|---|---|
| Name | Address | Location |
| USD - CLX 6200 Series | Local | 35 floor |

OK  Delete  Edit

420

HOST DEVICE WITH UNIVERSAL IMAGE SCANNING DEVICE DRIVER AND DRIVER MANAGEMENT METHOD THEREOF

CROSS-REFERENCE TO RELATED APPLICATIONS

This application claims the benefit of Korean Application No. 10-2009-0070735, filed Jul. 31, 2009, in the Korean Intellectual Property Office, the disclosure of which is incorporated herein by reference.

BACKGROUND

1. Field

Aspects of the present invention relate to a host device and a driver management method of the host device, and more particularly, to a host device including a universal image scanning device driver to generate a user-specified driver for a predetermined image scanning device, and to a driver management method of the host device.

2. Description of the Related Art

In general, a single computer is connected to a single scanner. However, according to the development of networks, a plurality of scanners are being connected to a plurality of computers via a variety of networks, and accordingly, users may select a desired scanner from the plurality of scanners which are connected via the networks to the plurality of computers.

In this situation, driver programs for each scanner need to be installed in computers in order to use the scanners because driver programs differ according to the manufacturer and model of scanners.

In other words, to use a predetermined scanner among the plurality of scanners, a user needs to install a driver program for the predetermined scanner in his or her computer even when a plurality of scanners are connected over networks, which may cause inconveniences to users.

To avoid such inconveniences, a universal driver program for scanners has been provided, so that only a single driver program may be used to control the plurality of scanners. When a universal driver program for scanners is used, there is no need to separately install driver programs to use a predetermined scanner.

Conventionally, a universal driver program for scanners is executed, and is used to search for all scanners connected via a network or a local connection to a computer and to display a list of the scanners found as a result of searching so that a user may select a desired scanner from the displayed list.

Accordingly, when a conventional universal driver program for scanners is executed, time is spent by searching for scanners. Additionally, all the scanners or multifunctional devices having a scanning function which are connected to the computer are displayed together with the list of scanners, and thus there are problems in that it is difficult for a user to find a desired scanner.

SUMMARY

Aspects of the present embodiment provide a host device and a driver management method thereof, to generate a user-specified driver which is set for an image scanning device selected by a user using a universal image scanning device driver, thereby simplifying the use of the universal image scanning device driver.

Additional aspects and/or advantages will be set forth in part in the description which follows and, in part, will be apparent from the description, or may be learned by practice of the invention.

The foregoing and/or other aspects are achieved by providing a driver management method of a host device in which a universal image scanning device driver capable of controlling a plurality of image scanning devices is installed, the method including searching for at least one image scanning device connected to the host device, displaying a list of the at least one image scanning device found as a result of the searching, selecting one of the at least one image scanning device from the displayed list, generating a user-specified driver for the selected at least one image scanning device, and adding the generated user-specified driver to the host device.

The method may further include controlling the selected image scanning device to perform a scanning operation according to a scanning option input through a driver user interface (UI) corresponding to the generated user-specified driver.

The generating of the user-specified driver may include storing setting information corresponding to the selected image scanning device in a data storage of an operating system (OS) in which image scanning device-related data is stored.

The setting information may include at least one of a model name, port information and address information of the selected at least one image scanning device, and identification information identifying the generated user-specified driver.

The identification information may include a name of the user-specified driver which is designated to distinguish the user-specified driver from a universal image scanning device driver and an image scanning device driver installed in the host device.

The identification information may be represented by a prefix or suffix to the generated user-specified driver, and by a model name of the selected image scanning device.

The identification information may be displayed on a list of at least one pre-installed image scanning device which is provided by at least one application unit so that an image scanning device to be used may be selected.

The method may further include executing the generated user-specified driver when the identification information is selected from the list of the at least one pre-installed image scanning device.

The method may further include providing notification of an unavailable status of the selected image scanning device when the selected image scanning device connected to the generated user-specified driver is determined to be unavailable.

The method may further include searching again for at least one image scanning device connected to the host device when the selected image scanning device connected to the generated user-specified driver is determined to be unavailable.

The foregoing and/or other aspects are achieved by providing a host device connected to at least one image scanning device, the host device including a universal image scanning device driver to search for the at least one image scanning device, and a display unit to display a list of the at least one image scanning device found as a result of searching, wherein the universal image scanning device driver generates a user-specified driver for a selected image scanning device and adds the generated user-specified driver to the host device when at least one image scanning device is selected from the displayed list.

The generated user-specified driver may control a scanning operation of the selected at least one image scanning device according to a scanning option input through a driver user interface (UI) corresponding to the generated user-specified driver.

The universal image scanning device driver may include a search unit to search for the at least one image scanning device, and a driver generator to generate the user-specified driver to control the selected image scanning device.

The driver generator may store setting information corresponding to the selected image scanning device in a data storage of an operating system (OS) in which image scanning device-related data is stored.

The setting information may include at least one of a model name, port information and address information of the selected image scanning device, and identification information identifying the generated user-specified driver.

The identification information may include a name of the user-specified driver designated to distinguish the user-specified driver from the universal image scanning device driver and an image scanning device driver of the host device.

The host device may further include an application unit to display a list of at least one pre-installed image scanning device so that an image scanning device to be used is able to be selected.

The application unit may display the identification information on the displayed list of the at least one pre-installed image scanning device.

The host device may include a universal image scanning device driver capable of controlling a plurality of image scanning devices.

The universal image scanning device driver may generate a data source for the selected image scanning device and may store setting information of the selected image scanning device in the generated data source to generate the user-specified driver for the selected image scanning device.

BRIEF DESCRIPTION OF THE DRAWINGS

These and/or other aspects and advantages will become apparent and more readily appreciated from the following description of the embodiments, taken in conjunction with the accompanying drawings of which:

FIGS. 3A to 3C are views exemplarily illustrating user interfaces (UIs) provided by a host device according to an exemplary embodiment.

DETAILED DESCRIPTION

Figure 1:
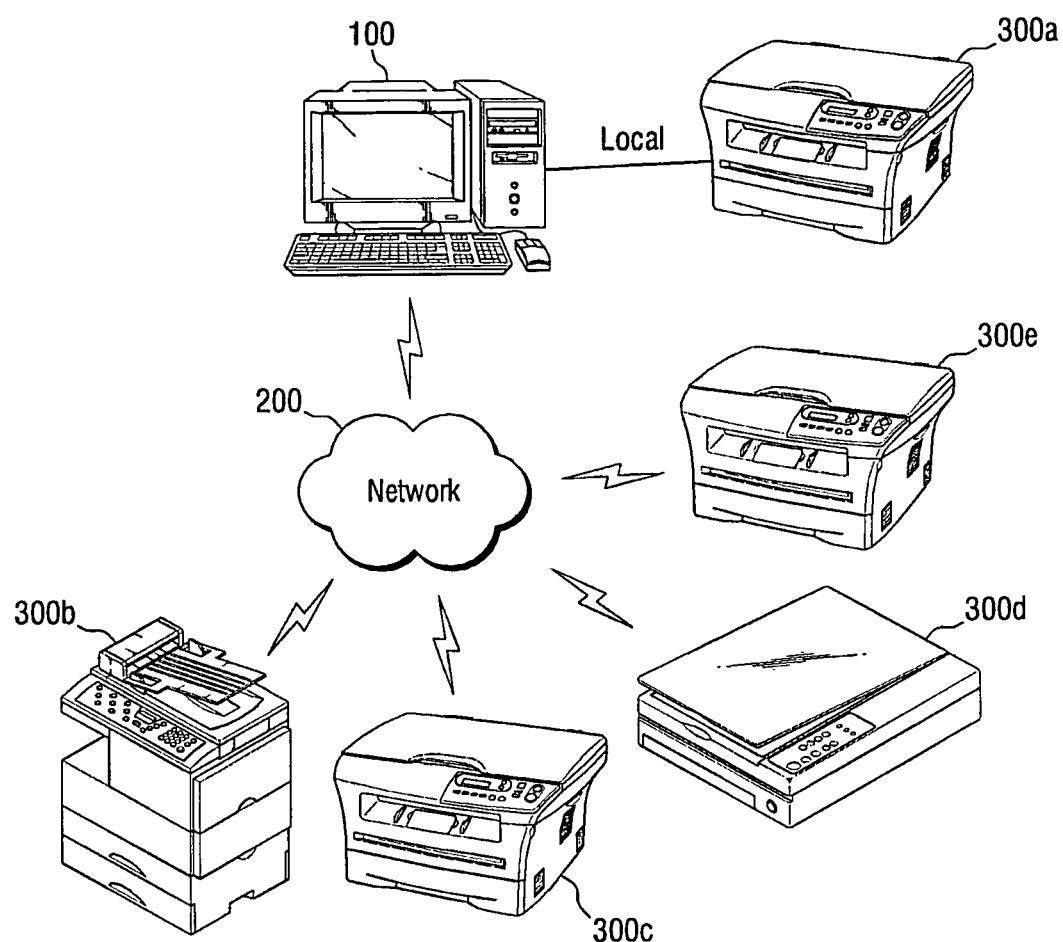
FIG. 1 is a view illustrating a scan system according to an exemplary embodiment.

Reference will now be made in detail to the exemplary embodiments, examples of, which are illustrated in the accompanying drawings, wherein like reference numerals refer to elements throughout. The embodiments are described below in order to explain the aspects of the present invention by referring to the figures.

FIG. 1 is a view illustrating a scan system according to an exemplary embodiment.

The scan system shown in FIG. 1 includes a host device 100, and a plurality of image scanning devices 300a to 300e. The host device 100 may be connected to the plurality of image scanning devices 300a to 300e via a local connection, such as a universal serial bus (USB), or via a network 200.

The host device 100 may include an image scanning device driver or a universal image scanning device driver which is installed therein to control the plurality of image scanning devices 300a to 300e which are connected via the local connection or the network 200. The host device 100 may typically be a personal computer (PC), for example, but is not limited thereto and will be described in detail with reference to FIG. 2 below.

The plurality of image scanning devices 300a to 300e have a scanning function, and may be connected to the host device 100 via the local connection or the network 200 as described above. In more detail, the plurality of image scanning devices 300a to 300e may be a single function device having a scanning function only, or may be a multi-function device having two or more functions among various functions, such as printing, scanning, faxing and copying functions.

As shown in FIG. 1, the image scanning device 300a is connected via the local connection to the host device 100, and the other four image scanning devices 300b to 300e are connected via the network 200 to the host device 100, but this is merely exemplary for convenience of description. Accordingly, there is no limitation to the number of image scanning devices that may be connected to the host device 100, the number of image scanning devices that may be connected via the local connection to the host device 100, and the number of image scanning devices that may be connected via the network 200 to the host device 100.

Figure 2:
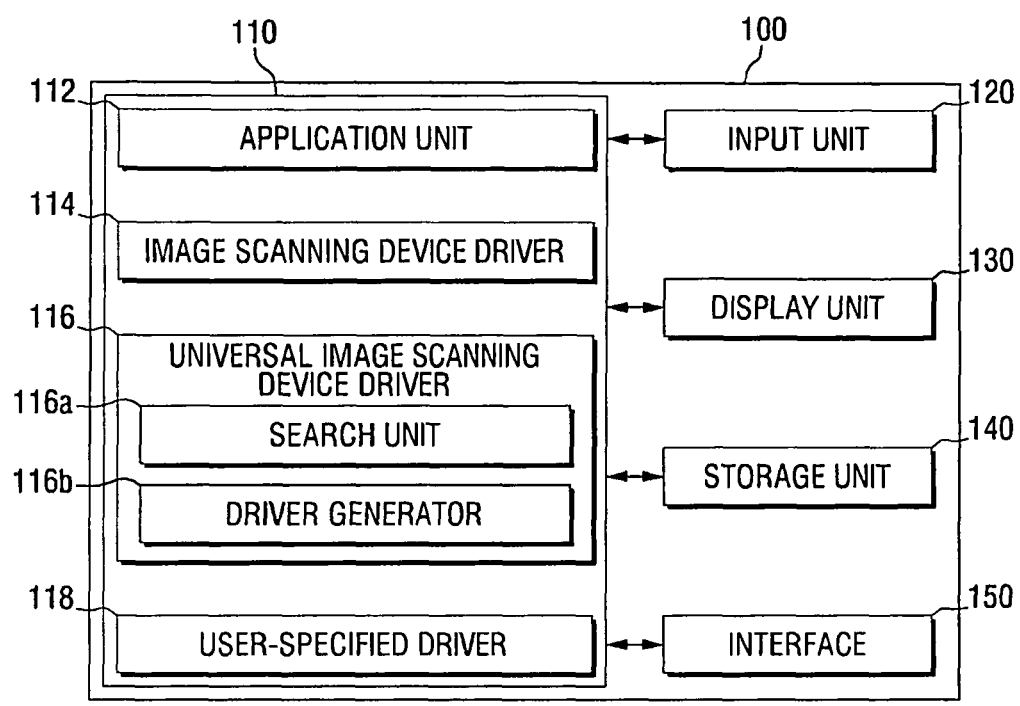
FIG. 2 is a block diagram illustrating a host device according to an exemplary embodiment.

FIG. 2 is a block diagram illustrating the host device 100 according to an exemplary embodiment.

In FIG. 2, the host device 100 includes a main controller 110, an input unit 120, a display unit 130, a storage unit 140 and an interface 150.

The main controller 110 includes an application unit 112, an image scanning device driver 114, a universal image scanning device driver 116 and a user-specified driver 118.

Although not shown in the drawings, the application unit 112, the image scanning device driver 114, the universal image scanning device driver 116 and the user-specified driver 118 included in the main controller 110 may be operated under the control of an operating system (OS).

The application unit 112 refers to a program executed by a user to use one of the plurality of image scanning devices 300a to 300e. The application unit 112 may be an image editing program, or a scanner program provided by the OS.

The application unit 112 enables a user to select execution of one of the image scanning device driver 114, the universal image scanning device driver 116 and the user-specified driver 118, and to emit and delete the user-specified driver 118.

The image scanning device driver 114 refers to a driver program provided for each of the plurality of image scanning devices 300a to 300e. The plurality of image scanning devices 300a to 300e is typically controlled by their respective driver programs according to model. For example, if a user desires to use all of the five image scanning devices 300a to 300e even when the host device 100 does not include the universal image scanning device driver 116 in the scan system shown in FIG. 1, the user needs to install five different driver programs.

The universal image scanning device driver 116 refers to a single driver program to control all of the plurality of image scanning devices 300a to 300e. When using the image scanning device driver 114 as described above, a user needs to install different driver programs for each of the image scanning devices 300a to 300e. However, when using the universal image scanning device driver 116, there is no need to install driver programs individually.

The universal image scanning device driver 116 receives setting information of the plurality of image scanning devices 300*a* to 300*e* from each of the plurality of image scanning devices 300*a* to 300*e* using a function of searching for the plurality of image scanning devices 300*a* to 300*e* connected to the host device 100.

The setting information may include at least one of a model name, port information and address information, for example. Additionally, the setting information may further include identification information identifying a user-specified driver, a current status, a resolution, document source information, information regarding whether to support a page count function, the image type, the maximum supportable size, an optical resolution, a supportable image compression format, information regarding whether to support encryption, and information regarding whether to support user authentication, in addition to the model name, port information and address information.

The universal image scanning device driver 116 may control the plurality of image scanning devices 300*a* to 300*e* using the received setting information.

The universal image scanning device driver 116 includes a search unit 116*a* and a driver generator 116*b*.

The search unit 116*a* searches for the plurality of image scanning devices 300*a* to 300*e* connected to the host device 100. In this situation, the search unit 116*a* may search for all of the plurality of image scanning devices 300*a* to 300*e* connected to the host device 100, regardless of a connection mode between the host device 100 and the plurality of image scanning devices 300*a* to 300*e*.

In more detail, to search for the plurality of image scanning devices 300*a* to 300*e* connected to the host device 100, the search unit 116*a* may broadcast search signals. Subsequently, the plurality of image scanning devices 300*a* to 300*e* send to the search unit 116*a* response signals in response to the search signals, and accordingly these image scanning devices sending the response signals may be found to be connected to the host device 100. In this situation, the response signals may include the setting information of the plurality of image scanning devices 300*a* to 300*e*.

The driver generator 116*b* generates the user-specified driver 118 for a single image scanning device selected by a user and adds the generated user-specified driver 118. For example, when a user enters a request signal to request generation of a user-specified driver for the selected image scanning device, the driver generator 116*b* may store setting information of the selected image scanning device in a data storage of the OS in which image scanning device-related data is stored, so that the user-specified driver 118 for the selected image scanning device may be generated.

Herein, the stored setting information may include not only information regarding the selected image scanning device, for example a model name, port information and address information, but also identification information identifying the user-specified driver for the selected image scanning device. The identification information may include a name of the user-specified driver 118 which is designated in order to distinguish the user-specified driver 118 from the image scanning device driver 114 or the universal image scanning device driver 116 which has already been installed in the host device 100.

The identification information may be represented by a prefix (for example, 'USD') or a suffix to the user-specified driver 118, or by a model name of the selected image scanning device. Accordingly, based on the identification information, a user may know that the user-specified driver is generated, and may recognize which image scanning device is connected to the generated user-specified driver.

As described above, the setting information of the selected image scanning device is previously stored in the data storage (namely, data source) of the OS, so if a user requests execution of the user-specified driver 118, an image scanning device corresponding to the pre-stored setting information may be controlled without a need to search for and select the plurality of image scanning devices 300*a* to 300*e*.

If the user requests execution of the user-specified driver 118, but if an image scanning device connected to the user-specified driver 118 is determined to be unavailable, the universal image scanning device driver 116 may notify the user of the unavailable status of the image scanning device.

In this situation, the universal image scanning device driver 116 may again search for at least one image scanning device connected to the host device 100.

The user-specified driver 118 refers to a driver program generated by the driver generator 116*b* of the universal image scanning device driver 116. In more detail, a user may select one from the plurality of image scanning devices 300*a* to 300*e* to generate the user-specified driver 118 for the selected image scanning device using the universal image scanning device driver 116.

The user-specified driver 118 may control operations of a corresponding image scanning device. The user-specified driver 118 may be operated in the same manner as the image scanning device driver 114. More specifically, if the image scanning device driver 114 is installed by a user, operations of a single image scanning device corresponding to the image scanning device driver 114 may be controlled. Likewise, the user-specified driver 118 may be used to control operations of a single image scanning device selected by a user.

However, the image scanning device driver 114 may be installed in the host device 100 manually by a user so that the user may use a predetermined image scanning device corresponding to the image-scanning device driver 114, whereas the user-specified driver 118 may be automatically installed for one selected from the plurality of image scanning devices 300*a* to 300*e* searched for by the universal image scanning device driver 116.

The input unit 120 receives a user manipulation signal input by a user using an input device of the host device 100, for example, a keyboard and a mouse. In the exemplary embodiment, the user manipulation signal received by the input unit 120 may include a selection signal to select one image scanning device from a list of image scanning devices which is provided by the universal image scanning device driver 116, and a selection signal to select one driver from a list of image scanning device drivers which is provided by the application unit 112.

The display unit 130 displays a variety of information which is to be provided to a user by the host device 100. In the exemplary embodiment, the display unit 130 may display the list provided by the universal image scanning device driver 116 and the list provided by the application unit 112.

Additionally, the display unit 130 may display various user interfaces (UIs) provided by the application unit 112, the image scanning device driver 114, the universal image scanning device driver 116 and the user-specified driver 118.

The storage unit 140 stores all kinds of information required to perform operations of the host device 100. The storage unit 140 may include the data storage in which the image scanning device-related data is stored, under the control of the OS.

The driver generator 116*b* of the universal image scanning device driver 116 stores setting information of an image scanning device corresponding to a user-specified driver to be generated in the data storage of the storage unit 140. Accordingly, the user-specified driver 118 may function as a driver program to control a scanning operation of the corresponding image scanning device, in the same manner as the image scanning device driver 114.

The interface 150 supports interfacing between the host device 100 and the plurality of image scanning devices 300*a* to 300*e*. Since the host device 100 is connected to the image scanning device 300*a* via the local connection, and connected to the image scanning devices 300*b* to 300*e* via the network 200, different connection interfaces are used. However, in the exemplary embodiment, these interfaces are not distinguished for convenience of description.

Figure 3C:
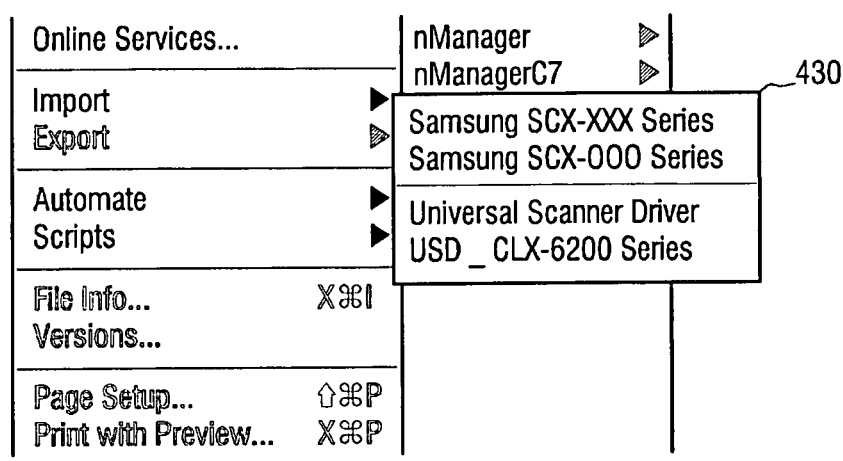

FIGS. 3A to 3C exemplarily illustrate UIs provided by the host device 100 according to an exemplary embodiment.

FIG. 3A exemplarily illustrates a UI 410 to display a list of image scanning devices while the driver generator 116*b* of the universal image scanning device driver 116 searches for the image scanning devices 300*a* to 300*e* connected to the host device 100.

In FIG. 3A, the list may display basic information in the setting information, for example, a device name, address information, location information and status information, to provide a user with information regarding the image scanning devices found as a result of searching. The setting information shown in FIG. 3A is merely exemplary and accordingly more variety of setting information may be displayed.

Additionally, in FIG. 3A, three image scanning devices are found as a result of searching by the search unit 116*a*. In this situation, if a user selects one of the three image scanning devices through the UI 410, a selection menu 412 may appear on the list.

For example, if a user selects one image scanning device from the list shown in FIG. 3A and clicks on a button on a mouse, for example, the selection menu 412 may be displayed. The selection menu 412 may include sub-menus, such as "Refine Search", "Show Information" and "Generate User-specified driver", for example, as shown in FIG. 3A.

The sub-menu "Refine Search" allows a user to revise or refine the current search so that the image scanning devices 300*a* to 300*e* connected to the host device 100 are searched again. In other words, if a user is not satisfied with the results of the last search, he or she may select "Refine Search."

The sub-menu "Show Information" enables a user to request display of setting information of an image scanning device selected by the user. In more detail, if a user selects "Show Information" from the selection menu 412, setting information other than the base information, such as the device name, address information, location information and status information which have been displayed on the list of shown in FIG. 3A may be displayed, so that the user may be provided with more detailed setting information of the selected image scanning device.

The sub-menu "Generate User-specified driver" enables a user to request generation of the user-specified driver 118 for an image scanning device selected by the user. If a user selects "Generate User-specified driver" from the selection menu 412, the driver generator 116*b* of the universal image scanning device driver 116 may generate the user-specified driver 118 for the selected image scanning device.

When the user selects "Generate User-specified driver" from the selection menu 412, and when the driver generator 116*b* of the universal image scanning device driver 116 generates the user-specified driver 118 for the selected image scanning devices shown in FIG. 3A, a UI 420 may be displayed as shown in FIG. 3B.

The UI 420 shown in FIG. 3B notifies a user of generation of the user-specified driver 118 for the selected image scanning device and of setting information including identification information identifying the user-specified driver 118. As shown in FIG. 3B, the user may know that the user-specified driver 118 for the image scanning device "CLX-6200 Series" is currently generated and the image scanning device "CLX-6200 Series" is connected via the local connection and is disposed on a "35 floor".

FIG. 3C exemplarily illustrates a UI 430 to display a list of image scanning device drivers which is provided by the application unit 112 after the user-specified driver 118 is generated. As shown in FIG. 3C, two image scanning device drivers 114, the universal image scanning device driver 116 and the user-specified driver 118 for "CLX-6200 Series" are currently installed in the host device 100. Accordingly, the UI 430 may enable a user to select an image scanning device to be used from the list of image scanning device drivers.

Figure 4:
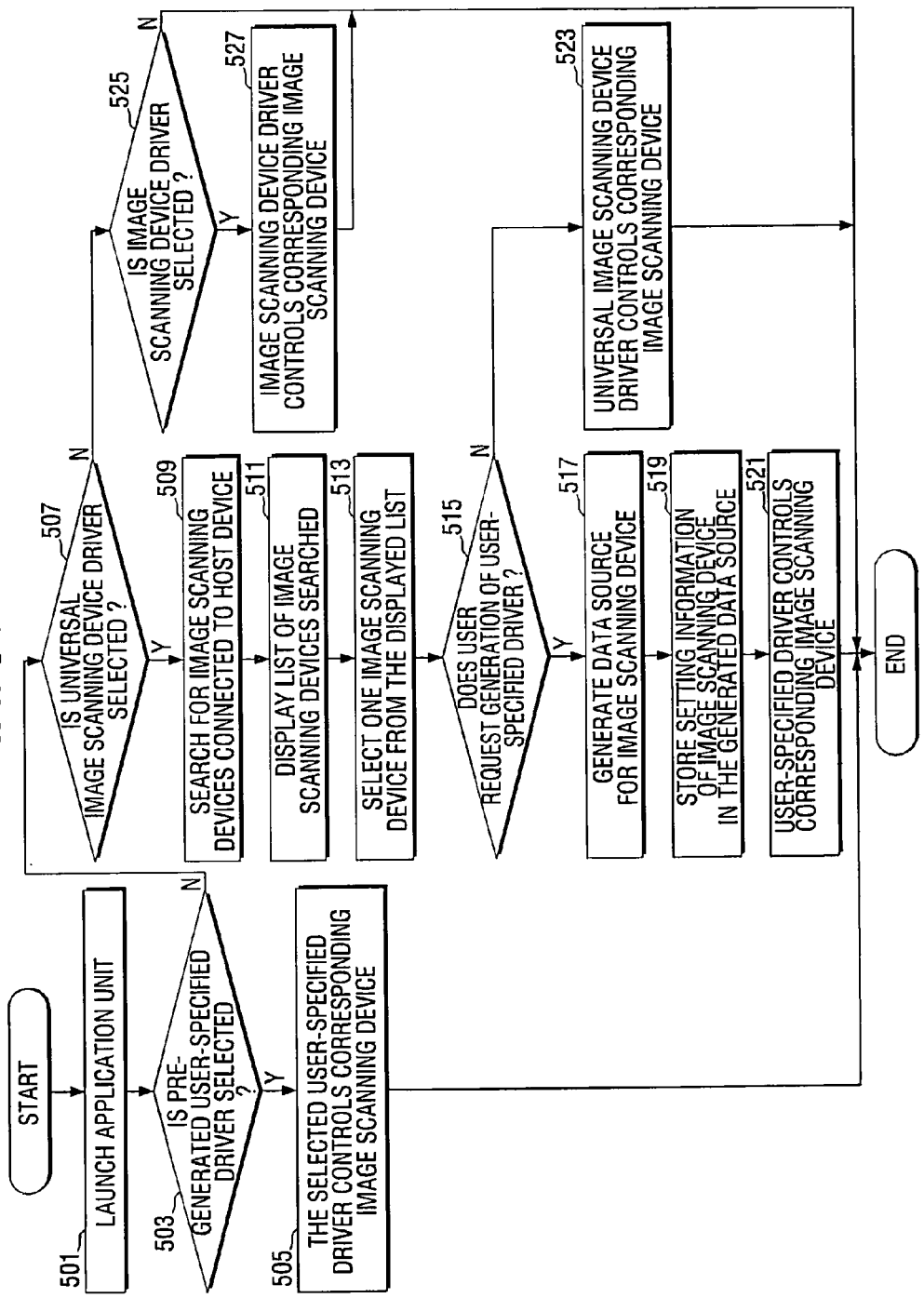
FIG. 4 is a flowchart explaining a host device operation method according to an exemplary embodiment.

FIG. 4 is a flowchart explaining a host device operation method according to an exemplary embodiment.

Hereinafter, the host device operation method according to the exemplary embodiment is now described with reference to FIGS. 1 to 4.

If a user desires to scan a document using one of the plurality of image scanning devices 300*a* to 300*e* connected to the host device 100, he or she launches the application unit 112 in operation 501. The application unit 112 provides the list of image scanning device drivers, as exemplarily shown in FIG. 3C, and the display unit 130 displays the list of image scanning device drivers, so that the user may select a desired image scanning device driver for an image scanning device to be used. The list of image scanning device drivers may show the image scanning device driver 114, the universal image scanning device driver 116 and the user-specified driver 118 which have been installed in the host device 100. However, if the user-specified driver 118 has not yet been generated, the identification information identifying the user-specified driver 118 may not be displayed.

The user may select the desired image scanning device driver for an image scanning device to be used from the list of image scanning device drivers. In this situation, if the pre-generated user-specified driver 118 is selected in operation 503, the selected user-specified driver 118 controls operations of a corresponding image scanning device in operation 505.

Alternatively, if a pre-generated user-specified driver is not selected at operation 503, a determination is made at operation 507 as to whether the universal image scanning device driver 116 is selected. If the universal image scanning device driver 116 is selected from the list of image scanning device drivers in operation 507, the search unit 116*a* of the universal image scanning device driver 116 searches for the plurality of image scanning devices 300*a* to 300*e* connected to the host device 100 in operation 509.

The universal image scanning device driver 116 displays a list of image scanning devices in the form of the UI 410 exemplarily shown in FIG. 3A on the display unit 130 in operation 511. The user selects one image scanning device from the list displayed on the display unit 130 in operation 513.

After operation 513, if the user requests generation of the user-specified driver 118 in operation 515, the driver generator 116*b* of the universal image scanning device driver 116 generates a data source for the selected image scanning device in operation 517, and stores setting information in the generated data source in operation 519. Accordingly, the user-specified driver 118 may be generated so as to be operated in the same manner as the image scanning device driver 114.

The generated user-specified driver 118 controls operations of a corresponding image scanning device in operation 521.

If the user does not request generation of the user-specified driver 118 at operation 515, the universal image scanning device driver 116 controls the corresponding image scanning device at operation 523.

Additionally, if the universal image scanning device driver is not selected in operation 507, a determination is made as to whether the image scanning device driver 114 is selected from the list of image scanning device drivers at operation 525. If an image scanning device driver 114 is selected from the list of image scanning device drivers in operation 525, the selected image scanning device driver 114 controls operations of a corresponding image scanning device in operation 527.

As described above, the universal image scanning device driver 116 generates the user-specified driver 118 for the image scanning device selected by the user. The generated user-specified driver 118 may be operated in the same manner as the image scanning device driver 114.

However, the image scanning device driver 114 may be installed in the host device 100 manually by a user, whereas the user-specified driver 118 may be generated by the universal image scanning device driver 116 without the need for a user to install any driver program.

Therefore, it is possible for a user to use a desired image scanning device without a need to separately install a driver program for the desired image scanning device. Additionally, since time is required to search for image scanning devices connected to a host device even when a universal image scanning device driver is used, some inconveniences may be caused. However, it is possible to avoid such inconveniences, if a user-specified driver for a frequently used image scanning device is generated and stored in the host device.

While there have been illustrated and described what are considered to be exemplary embodiments, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, more than one image area may be selected, enlarged, and added to the captured image, or the selected image area may not be enlarged. Furthermore, multiple keywords may be applied to one icon. Accordingly, it is intended, therefore, that the present invention not be limited to the various exemplary embodiments disclosed, but that the present invention includes all embodiments falling within the scope of the appended claims.

What is claimed is:

1. A driver management method for a host device, comprising:
    installing a universal image scanning device driver in the host device, the universal image scanning device driver to control a plurality of image scanning devices connected to the host device;
    searching for the plurality of image scanning devices connected to the host device using the universal image scanning device driver;
    displaying a list of the plurality of image scanning devices found as a result of the searching;
    selecting at least one image scanning device from the displayed list;
    generating a user-specified driver for the selected at least one image scanning device using the universal image scanning device driver;
    adding the generated user-specified driver to the host device; and
    displaying a second list of a plurality of image scanning device drivers including, at least, the generated user-specified driver and the universal image scanning device driver,
    wherein upon user selection of the generated user-specified driver, controlling, using the generated user-specified driver, the selected at least one image scanning device to perform a scanning operation according to a scanning option input through a driver user interface (UI) corresponding to the generated user-specified driver,
    wherein controlling, using the generated user-specified driver, does not include using the universal image scanning device driver.

2. The method according to claim 1, wherein the generating of the user-specified driver using the universal image scanning device driver comprises storing setting information corresponding to the selected at least one image scanning device in a data storage of an operating system (OS) in which image scanning device-related data is stored and generating the user-specified driver based on the stored setting information.

3. The method according to claim 2, wherein the setting information comprises at least one of a model name, port information and address information of the selected at least one image scanning device, and identification information identifying the generated user-specified driver.

4. The method according to claim 3, wherein the identification information comprises a name of the user-specified driver which is designated to distinguish the user-specified driver from a universal image scanning device driver and an image scanning device driver installed in the host device.

5. The method according to claim 3, wherein the identification information is displayed on a list of at least one pre-installed image scanning device which is provided by at least one application unit so that an image scanning device to be used is selected.

6. The method according to claim 5, further comprising executing the generated user-specified driver when the identification information is selected from the list of the at least one pre-installed image scanning device.

7. The method according to claim 6, further comprising providing notification of an unavailable status of the selected at least one image scanning device when the selected at least one image scanning device connected to the generated user-specified driver is determined to be unavailable.

8. The method according to claim 6, further comprising searching again for at least one image scanning device connected to the host device when the selected at least one image scanning device connected to the generated user-specified driver is determined to be unavailable.

9. The method according to claim 1, further comprising displaying a list including the selected image scanning device corresponding to the added user-specified driver and/or at least one previously added user-specified device.

10. The method according to claim 1, further comprising:
    controlling, using the universal image scanning device driver, one of the plurality of image scanning devices to perform a second scanning operation according to a second scanning option input through the driver UI corresponding to the universal image scanning device driver.

11. The method according to claim 1, wherein the displaying of the second list of the plurality of image scanning device drivers includes not displaying all of the plurality of image scanning devices connected to the host device to reduce a number of selectable image scanning devices displayed to a user.

12. A host device connected to a plurality of image scanning devices, the host device comprising:
- a universal image scanning device driver to search for the plurality of image scanning devices and control the plurality of image scanning devices connected to the host device;
- a display unit to display a list of at least one image scanning device found as a result of the searching for the plurality of image scanning devices,
- wherein when the at least one image scanning device is selected from the displayed list, the universal image scanning device driver generates a user-specified driver for the selected at least one image scanning device and adds the generated user-specified driver to the host device,
- wherein a second list of a plurality of image scanning device drivers including, at least, the generated user-specified driver and the universal image scanning device driver is displayed by the display unit,
- wherein upon user selection of the generated user-specified driver, the generated user-specified driver controls a scanning operation of the selected at least one image scanning device according to a scanning option input through a driver user interface (UI) corresponding to the generated user-specified driver, and
- wherein the control performed by the generated user-specified driver does not include using the universal image scanning device driver.

13. The host device according to claim 12, wherein the universal image scanning device driver comprises:
- a search unit to search for the at least one image scanning device; and
- a driver generator of the universal image scanning device driver to generate the user-specified driver to control the selected image scanning device.

14. The host device according to claim 13, wherein the driver generator stores setting information corresponding to the selected image scanning device in a data storage of an operating system (OS) in which image scanning device-related data is stored and generates the user-specified driver based on the stored setting information.

15. The host device according to claim 14, wherein the setting information comprises at least one of a model name, port information and address information of the selected image scanning device, and identification information identifying the generated user-specified driver.

16. The host device according to claim 15, wherein the identification information comprises a name of the user-specified driver designated to distinguish the user-specified driver from the universal image scanning device driver and an image scanning device driver of the host device.

17. The host device according to claim 12, further comprising:
- an application unit providing a list of at least one pre-installed image scanning device to display in the display unit so that an image scanning device to be used is able to be selected.

18. The host device according to claim 17, wherein the display unit displays identification information on the displayed list of the at least one pre-installed image scanning device provided by the application unit.

19. The host device according to claim 12, wherein the display unit displays a list including the selected image scanning device corresponding to the added user-specified driver and/or at least one previously added user-specified device.

20. The method according to claim 12, wherein the universal image scanning device driver controls one of the plurality of image scanning devices to perform a second scanning operation according to a second scanning option input through the driver UI corresponding to the universal image scanning device driver.

* * * * *

UNITED STATES PATENT AND TRADEMARK OFFICE
CERTIFICATE OF CORRECTION

PATENT NO. : 8,854,636 B2  
APPLICATION NO. : 12/656782  
DATED : October 7, 2014  
INVENTOR(S) : Kyung-hoon Kang et al.

Page 1 of 1

It is certified that error appears in the above-identified patent and that said Letters Patent is hereby corrected as shown below:

In the Claims

Column 12, line 33, in Claim 20, delete "method" and insert -- host device --, therefor.

Signed and Sealed this
Twenty-first Day of July, 2015

Michelle K. Lee
*Director of the United States Patent and Trademark Office*